United States Patent [19]
West

[11] Patent Number: 5,670,178
[45] Date of Patent: Sep. 23, 1997

[54] METHOD AND APPARATUS FOR APPLYING FOAM PLASTIC MATERIALS TO A ROOF DECK

[76] Inventor: Richard A. West, 31303 Nantucket Row, Bay Village, Ohio 44140

[21] Appl. No.: 515,953

[22] Filed: Aug. 16, 1995

[51] Int. Cl.$^6$ .............. E04D 15/00; E04F 13/02
[52] U.S. Cl. .............. 425/4 C; 425/64; 425/224; 425/817 C
[58] Field of Search .............. 156/71, 79; 425/4 R, 425/4 C, 817 C, 64, 224, 447, 449; 264/45.8, 46.4

[56] References Cited

U.S. PATENT DOCUMENTS

| | | |
|---|---|---|
| 1,780,427 | 11/1930 | Kirkham . |
| 3,118,353 | 1/1964 | Neil . |
| 3,272,098 | 9/1966 | Buchholtz et al. . |
| 3,423,791 | 1/1969 | Smith .............. 425/4 R |
| 3,548,453 | 12/1970 | Garis .............. 425/4 R |
| 3,619,343 | 11/1971 | Freeman . |
| 3,698,972 | 10/1972 | Lenzner .............. 156/337 |
| 4,087,296 | 5/1978 | Hooker .............. 425/4 C |
| 4,093,411 | 6/1978 | Lee .............. 425/817 C |
| 4,115,976 | 9/1978 | Rohrer . |
| 4,507,015 | 3/1985 | Furukawa et al. . |
| 4,591,291 | 5/1986 | Owens . |
| 4,661,011 | 4/1987 | Halim . |
| 4,947,603 | 8/1990 | Goertz . |
| 5,119,611 | 6/1992 | Goertz . |
| 5,165,210 | 11/1992 | Partyka et al. . |

*Primary Examiner*—Daniel Stemmer
*Attorney, Agent, or Firm*—Vickers, Daniels & Young

[57] ABSTRACT

Foamed plastic is applied on a roof substrate by progressively dispensing expandable plastic foam material on the substrate along a path and progressively confining the vertical and lateral expansion of the material along the path and relative to the substrate. Apparatus for applying the foamed plastic comprises a platform having opposite ends and opposite sides having an endless belt supported on the platform for displacement relative thereto in the direction between the opposite ends. The belt is supported above the roof substrate by laterally spaced rails or by tracks on the belt, and a motor is provided on the platform for driving the belt to move the platform along the path. A dispensing gun is supported on the front end of the platform for dispensing expandable plastic foam material onto the substrate ahead of the belt and vertical and lateral expansion of the material is confined by the belt and rails or tracks as the platform moves along the path.

10 Claims, 5 Drawing Sheets

METHOD AND APPARATUS FOR APPLYING FOAM PLASTIC MATERIALS TO A ROOF DECK

BACKGROUND OF INVENTION

The present invention relates to the art of roofing and, more particularly, to an improved method and apparatus for applying plastic foams to a roof deck.

The spray application of plastic foams, such as polyurethane foams, to a roofing deck to provide an essentially seamless roof is well known. The foam is typically made of two components which, when mixed together, react to create exothermic heat. By adding a blowing agent to the two components, the exothermic reaction causes the mixture to expand, trapping the blowing agent in cells thus to produce a plastic foam having excellent insulating and other properties as a roofing material. Generally, the liquid chemicals are preheated and pumped at high pressures through several hundred feet of heated hose, and the chemicals are mixed in a gun and sprayed onto the roof surface where they cure in a matter of seconds.

A considerable number of problems are attendant to the spray application of plastic foams to roof decks, nonetheless of which is atomization of the sprayed material which results in airborne contaminants in the area of application and the loss of foam material which does not get deposited on the roof surface. Moreover, airborne contaminants are a health hazard to the person doing the spray application and other persons in the vicinity thereof and, in this respect, such persons are subject to potential respiratory problems as the result of inhaling the contaminants and/or may experience skin and/or eye irritation as a result of the airborne contaminants. Further, if the plastic foam is sprayed when the humidity of ambient air is high, the atomized foam absorbs moisture in the air which can affect physical properties of the sprayed foam such as by lowering the density and compressive values thereof. Still further, the spray application of plastic foam on roofs is time consuming and tiring for the person operating the spray equipment, and the spray application to provide an acceptable roof requires a highly-trained operator. In this respect, it is difficult to maintain a constant depth of the plastic foam, and if multiple layers are sprayed in order to obtain a desired thickness relative to the roof surface, such layering can result in delamination problems during the life of the roof. Generally, the plastic foam is spray-applied to a roof surface along adjacent parallel runs which produces a leathered joint or pass line between the adjacent runs having a thin area at the outer surface of the adjacent runs. This thin area is subject to blistering if the foam material per se provides the roof surface, and such blistering affects the appearance of the roof as well as providing the potential for separation of the adjacent runs along the pass line and providing a passage therebetween for the leakage of water through the foam material. Often, strips of covering material such as felt or tar paper are applied over the outer surface of the foam material, and the application of these material strips which have to be bonded to the foam and sealed at the joints therebetween further adds to the time and cost of laying a roof.

SUMMARY OF THE INVENTION

In accordance with the present invention, a new method and apparatus is provided for laying a plastic foam roof which overcomes or minimizes the foregoing and other problems or disadvantages attendant to the spray application of foam on a roof deck. More particularly in accordance with the present invention, the plastic foam chemicals are mixed and dispensed onto a roof deck ahead of a moving wall which is spaced above the deck and cooperable with a side-containment arrangement to define the vertical thickness and lateral width of a strip of plastic foam which is applied to the roof deck as the wall moves along a path thereacross and the mixed chemicals react and expand within the confines of the wall and the lateral containment. The exothermic heat released during reaction of the plastic foam chemicals is confined between the wall and lateral containment producing an oven effect which promotes the curing process. The mixed chemicals are dispensed and the wall is moved relative to the roof deck at rates which provide for the chemical reaction to be complete and the plastic foam set when exiting the trailing edge of the wall, thus to provide a plastic foam strip of uniform thickness and width having an extremely smooth upper surface. The lateral confinement advantageously provides for the pass line between laterally adjacent strips or runs to be perpendicular or at a slight angle relative to the roof deck, thus avoiding blistering which results from the feathered edging of spray-applied plastic foam to roofs. Furthermore, the wall provides for the outer surfaces of laterally adjacent runs to be smooth and of uniform thickness relative to the roof deck, thus avoiding the time and skill required in attempting to achieve uniformity between adjacent spray-applied areas. Moreover, application of plastic foam to a roof deck in accordance with the present invention is about 30% faster than spray application and does not require the degree of training and skill necessary for acceptable application of plastic foam by spraying. Still further, dispensing of the mixed chemicals relative to an area of confinement in which the reaction therebetween takes places advantageously avoids the over-spray problem and the problem of air-borne contaminants in the work environment which are attendant to spray application, while optimizing utilization of the foam material. Still further, since there is no need to atomize the chemicals in the manner necessary for spray application, health hazards are minimized and roofs can be installed in weather conditions not acceptable for spray application as a result of the affect of humidity on the foam material.

Further in accordance with the invention, the plastic foamroofing can be laid in laterally adjacent strips or runs whereby, following the first run, one side of the latter provides the lateral confinement for the corresponding side of the adjacent run. Alternatively, sequential runs can be laid in laterally spaced apart relationship and, thereafter, runs are laid therebetween, whereby lateral confinement for the latter runs is provided by the laterally opposed sides of the spaced-apart runs. In accordance with another aspect of the invention, a membrane of material can be fed between the moving wall and expanding foam during the laying of a run. If the moving wall is of a structure or material which would tend to cause adherence thereof with the foam, the membrane can be a film of plastic material which would preclude such adhesion and which could be removed from the set foam following laying of the run. Alternatively, independent of any tendency of the foam to adhere with the wall, the membrane can be of a material intended to adhere with the foam, such as a fabric, tar paper, rubber or the like. Such material provides the outer surface of the foam with resistance to hail and other mechanical damage. By laying the membrane with the foam it is only necessary to seal the seams therebetween to complete the roof surface, and this advantageously avoids the time required to lay such covering material after a spray application and to fasten the material to the foam such as through the use of mechanical fasteners.

In accordance with another aspect of the invention, the moving wall is preferably defined by an endless belt, and lateral confinement during the first run is provided by rails on which the belt rides or on tracks or treads removably mounted on the belt for movement therewith. In either event, a run laterally adjacent the first run is achieved with one side of the belt riding on the outer surface of the first run, and a run between laterally spaced apart previous runs is achieved with the belt riding on the outer surfaces of the two spaced runs.

It is accordingly an outstanding object of the present invention to provide a new method and apparatus for laying plastic foam on a roof deck.

Another object is the provision of a method and apparatus for the foregoing purpose which reduces the time heretofore required to apply a plastic foam roof by spray application, which reduces the operator training required relative to that of spray application, minimizes health hazards attendant to spray application, and loss of materials through over spraying.

A further object is the provision of a method and apparatus for the foregoing purpose which enables the installation of plastic foam roofs during weather conditions which cause foam inconsistencies in connection with spray application due to the effect of humidity and the absorption of airborne moisture by atomized spray, thus to increase roof laying opportunities for a contractor relative to such opportunities in connection with spray application.

Still another object is the provision of a method and apparatus for the foregoing purpose which enables the laying of plastic foam to a desired thickness without multiple layering, thus eliminating lamination problems encountered heretofore in connection with the spray application of foam roofs.

Still another object is the provision of a method and apparatus for the foregoing purpose which enables the laying of runs of plastic foams without feathered edges, thus to minimize or eliminate blistering problems encountered in connection with adjacent areas having a feathered seam therebetween.

Yet a further object is the provision of a method and apparatus for the foregoing purpose which enables the laying of a plastic foam roof having an extremely smooth outer surface and, selectively, the concurrent laying of a membrane of roofing material on the outer surface to enhance the structural integrity thereof and to enhance the resistance thereof to physical damage.

BRIEF DESCRIPTION OF THE DRAWINGS

The foregoing objects, and others, will in part be obvious and in part pointed out more fully hereinafter in conjunction with the description of preferred embodiments of the present invention illustrated in the accompanying drawings in which.

DESCRIPTION OF PREFERRED EMBODIMENTS

Figure 1:
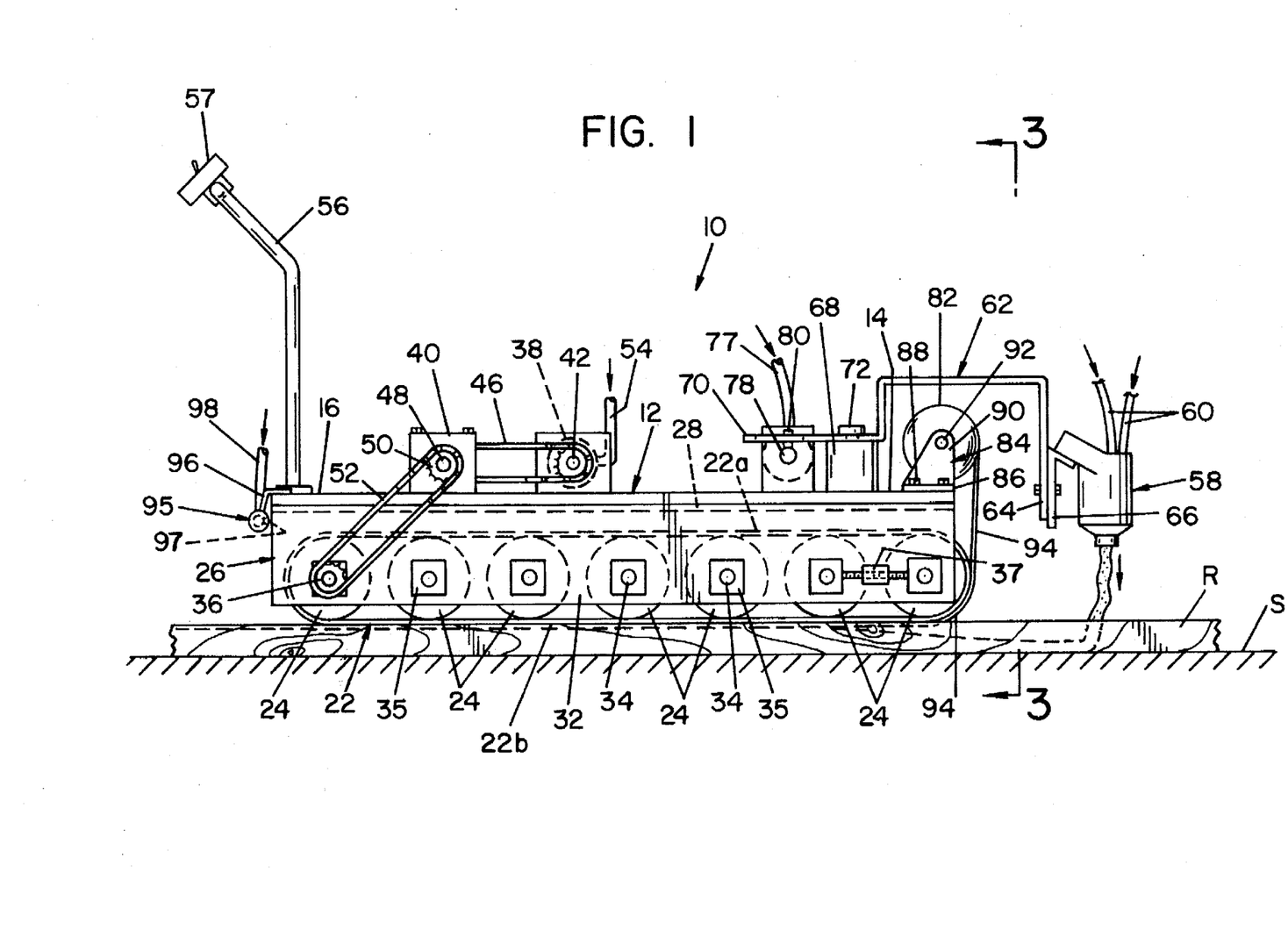
FIG. 1 is a side elevation view of the apparatus for applying foam plastic material to a roof deck in accordance with the present invention.
Figure 2:
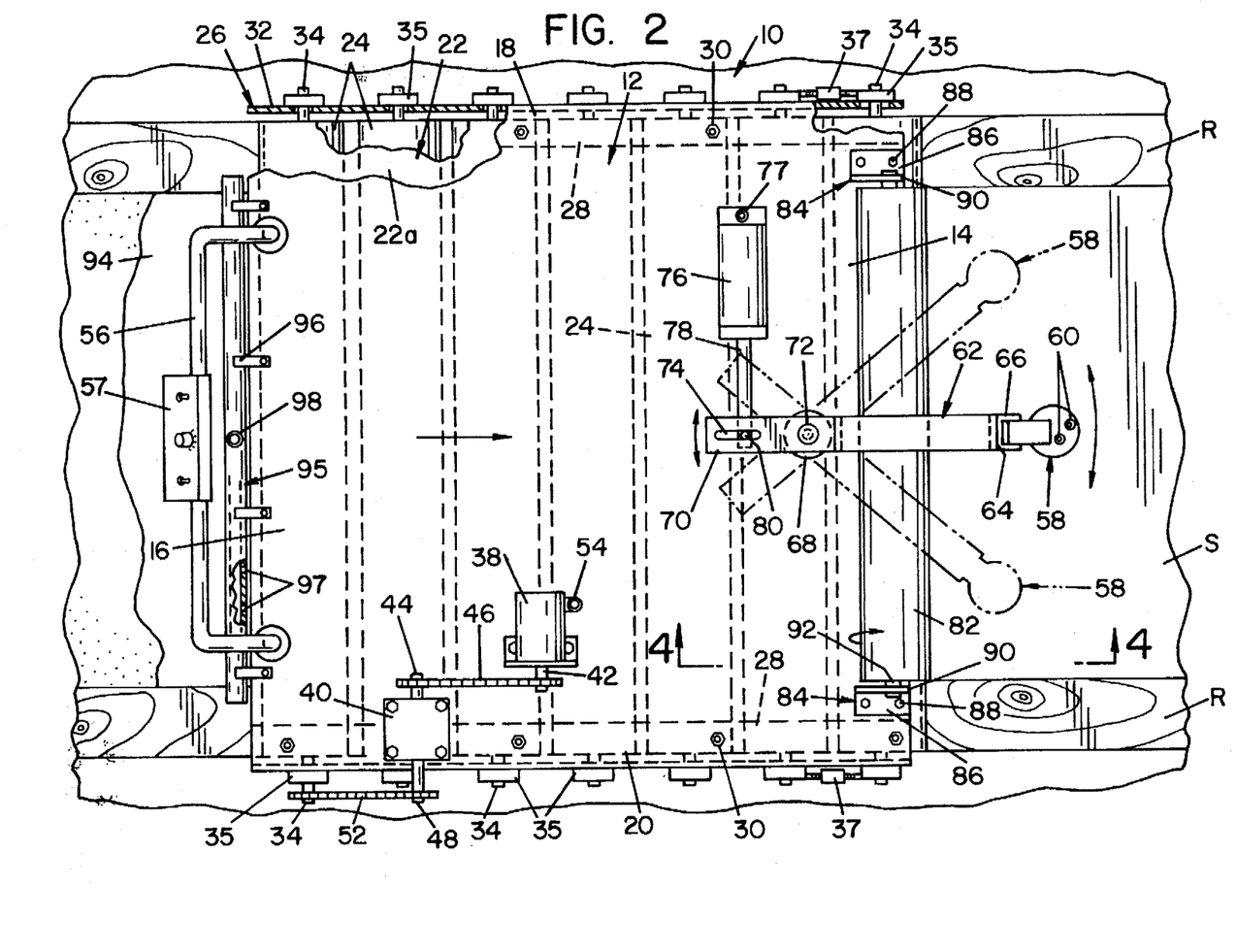
FIG. 2 is a plan view of the apparatus shown in FIG. 1.
Figure 3:
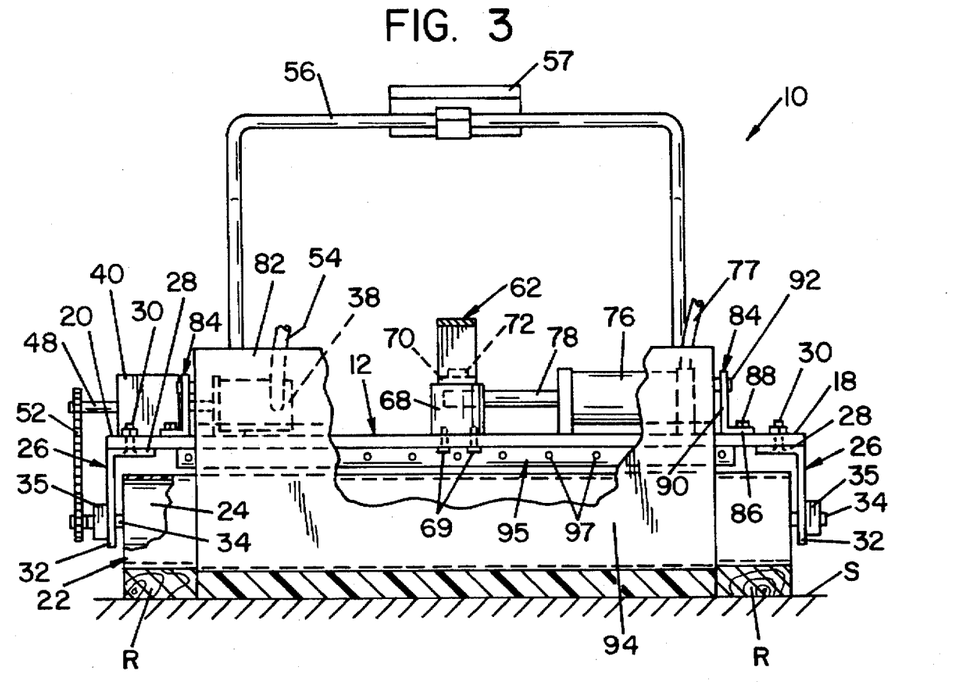
FIG. 3 is a front elevation view of the apparatus, partially in section, taken along line 3—3 in FIG. 1.

Referring now in greater detail to the drawings wherein the showings are for the purpose of illustrating preferred embodiments of the invention only and not for the purpose of limiting the invention, FIGS. 1–3 illustrate apparatus 10 for applying expandable plastic foam material to a roofing deck or substrate S in accordance with the invention. Apparatus 10 includes a platform 12 having longitudinally spaced-apart front and rear ends 14 and 16, respectively, and laterally spaced-apart opposite sides 18 and 20. In this embodiment, the apparatus includes an endless belt 22 supported beneath platform 12 by a plurality of rollers 24 closely spaced apart in the direction between ends 14 and 16 of the platform and extending between sides 18 and 20 thereof. More particularly, sides 18 and 20 of platform 12 are provided with longitudinally extending inverted L-shaped support members 26 having upper legs 28 extending inwardly beneath the platform and secured thereto by suitable threaded fastener assemblies 30. Members 26 further include legs 32 extending downwardly from the laterally outer ends of legs 28 and between which rollers 24 are rotatably supported by corresponding shafts 34 extending through bearing blocks 35 provided therefor on legs 32. The shaft 34 and bearings 35 supporting the roller 24 at front end 14 of platform 12 are longitudinally slidable relative to legs 32 of support members 26, and turnbuckles 37 are mounted between shafts 34 of the two front rollers to facilitate tensioning of belt 22. Preferably, rollers 24 are mounted on legs 32 such that the lower most surfaces thereof are spaced below the lower edges of the legs.

Belt 22 has upper and lower runs 22a and 22b, respectively, and as will become apparent hereinafter the belt is driven relative to platform 12 for upper run 22a to move in the direction from rear end 16 toward front end 14 of the platform. In the present embodiment, this is achieved by providing one of the outer ends of shaft 34 of the roller 24 adjacent rear end 16 of the platform with sprocket wheel 36 adapted to be driven by a motor 38 on platform 12 through a gearbox 40. Motor 38 may, for example, be an air motor having an output shaft 42 drivingly coupled with input shaft 44 of gearbox 40 by a drive belt or chain 46, and gearbox 40 has an output shaft 48 provided with a sprocket wheel 50 coupled with sprocket wheel 36 by drive chain 52. Motor 38 is adapted to be connected to a source of air, not shown, by means of hose 54. For the purpose set forth hereinafter, rear end 16 of platform 12 is provided with an upwardly and rearwardly extending tubular handle 56 on which a control panel 57 is mounted.

Front end 14 of platform 12 is adapted to support a dispensing gun 58 by which expandable plastic foam material is dispensed on substrate S as described in greater detail hereinafter. Gun 58 is connected in a well known manner by hoses 60 to suitable dispensing equipment by which component materials are heated and delivered to gun 58 for mixing therein and dispensing therefrom onto substrate S. Suitable equipment for this purpose is available, for example, from Gusmer Corporation of Lakewood, New Jersey, under the latter's product designation Model H-2000 High Pressure Proportioner. In the embodiment illustrated in FIGS. 1–3, gun 58 is a pour gun by which the mixed foamable plastic material is poured onto substrate S. Such a pour gun is available, for example, form Gusmer Corporation under the latter's product designation Model AR-C or D Pour Gun. In the present embodiment, gun 58 is supported outwardly adjacent front end 14 of platform 12 and above substrate S by a support arm 62 having a downwardly extending outer end 64 provided with a vertically adjustable bracket 66 to which gun 58 is suitably secured and by which the gun is vertically adjustable relative to substrate S. While not shown, it will be appreciated that the portion of arm 62 inwardly adjacent end 64 can be made in two pieces longitudinally overlapped and interconnected to provide for adjusting the spacing of gun 58 forwardly of the platform. Arm 62 is generally centrally located relative to sides 18 and 20 and, in this embodiment, is mounted on platform 12 for oscillating displacement relative to sides 18 and 20 to provide for laterally spreading the material dispensed onto substrate S. More particularly, in this respect, platform 12 is provided with a support block 68 secured thereto by fasteners 69, and arm 62 includes an inner leg 70 pivotally mounted on block 68 by means of a suitable pivot pin 72. The innermost end of leg 70 is provided with an elongated slot 74, and an air motor 76 having a reciprocating output shaft 78 is suitably mounted on platform 12 for shaft 78 to reciprocate laterally thereof. Shaft 78 is provided with a pin 80 extending upwardly through slot 74, whereby reciprocation of shaft 78 imparts oscillating displacement to arm 62 and thus gun 58 on the outer end thereof. Motor 76 is adapted to be connected to a source of air by means of a hose 77.

Preferably, for the reasons set forth hereinafter, a roll 82 of flexible sheet material is supported at front end 14 of platform 12 between sides 18 and 20 thereof. More particularly, in this respect, a pair of L-shaped brackets 84 have lower legs 86 extending inwardly relative to the corresponding side of the platform and secured thereto by suitable fasteners 88, and upwardly extending legs 90 having openings therethrough for receiving and supporting the corresponding end of a roll shaft 92. As best seen in FIG. 1, the sheet material 94 on roll 82 is adapted to be fed downwardly across the leading edge of platform 12 and beneath belt 22 during use of the apparatus and for the purposes set forth hereinafter.

Preferably, the belt assembly is cooled by blowing air between the underside of platform 12 and upper run 22a of belt 22. This can be achieved in any desired manner and, in the embodiment illustrated, such cooling is provided by an air manifold tube 95 mounted on rear end 16 of the platform by suitable brackets 96 to extend laterally in the direction between sides 18 and 20 of the platform at a level vertically aligned with the space between the underside of the platform and upper belt run 22a. Manifold tube 95 is provided with a plurality of outlet openings 97 along the length thereof for directing air into the latter space and is connected to a suitable source of air under pressure, not shown, by a hose 98.

With reference to FIGS. 1–5, operation of the apparatus as thus far described is as follows. A pair of rails R are positioned on substrate S in laterally spaced-apart parallel relationship to define a path along which a pass of the foamable plastic material is to be applied. Rails R may, for example, be provided by wood 2×4s, and apparatus 10 is supported on the rails for movement therealong. More particularly, in this respect, belt 22 rests on the tops of rails R whereby driving of the belt moves the apparatus therealong. Further, rails R space the bottom run 22b of belt 22 above substrate S whereby, as will become apparent hereinafter, the belt provides a wall which vertically confines expansion of the plastic foam material and the laterally inner sides of rails R provide for laterally confining expansion of the material. With the apparatus so supported on rails R, motor 38 is operated to drive belt 22 and thus move the apparatus forwardly along rails R, motor 76 is operated to oscillate gun 58, air is supplied to manifold 95, and the material dispensing equipment is operated for the foamable plastic material to be dispensed from the nozzle of gun 58 onto substrate S between rails R and forwardly of the leading edge of platform 12. In the embodiment illustrated, sheet material 94 is introduced between belt 22 and the foamable plastic material and is automatically dispensed from roll 82 as the apparatus moves along rails R. As the apparatus moves along rails R and thus over the material being dispensed from gun 58, the material expands beneath the apparatus and is vertically and laterally confined by the belt and rails. The operator of the apparatus walks therebehind and uses handle 56 to guide the apparatus so as to maintain the latter on rails R, and control knobs on control panel 57 enable the operator to start, stop, and control the speed of drive motor 38, control nozzle oscillating motor 76 and the starting and stopping of the dispensing of plastic foam material from gun 58. The air source for motors 38 and 76 and for manifold 95 and the equipment for delivering the chemicals to gun 58 are supported on the roof deck remote from apparatus 10 to minimize the weight and size thereof.

Figure 4:
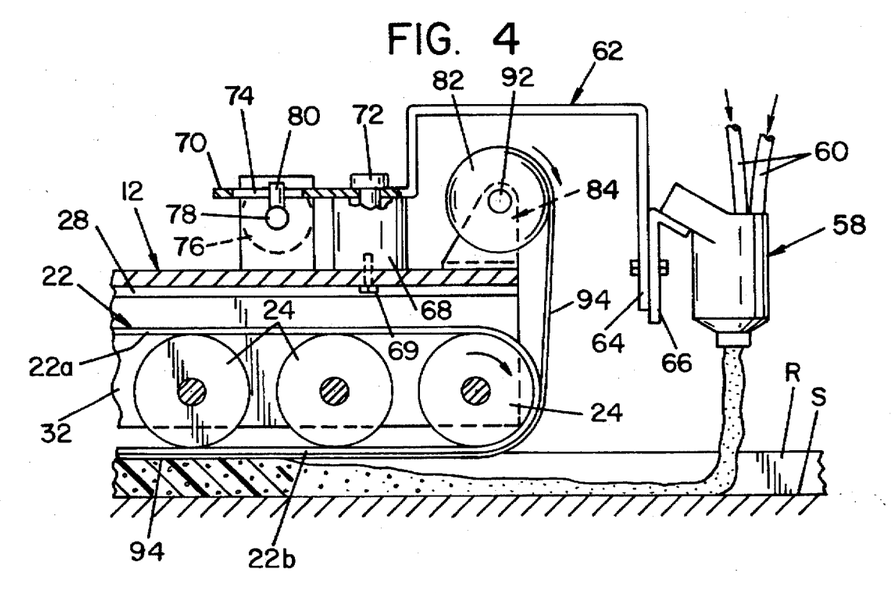
FIG. 4 is a detail sectional elevation view looking in the direction of line 4—4 in FIG. 2 and somewhat schematically illustrating the dispensing and expansion of plastic foam material beneath the apparatus shown in FIGS. 1–3.

The interposing of sheet material 94 between belt 22 and the plastic foam material is optional and, when used, is selective with respect to the type of the material. In this respect, for example, material 94 can be a plastic film to assure against any adherence between belt 22 and the expanding and setting plastic foam in the event that belt 22 is not of a material which alone or through a suitable release agent coating thereon would preclude such adherence. Such a plastic release film can remain on the outer surface of the expanded and set plastic foam or it can be removed therefrom in connection with further coating of the outer surface of the plastic foam to complete the roof structure. Alternatively, material 94 can be any one of a number of standard roofing materials such as rubber, tar paper or fabric mesh, for example, which advantageously is bonded to the outer surface of the plastic foam material when the latter sets, thus to enable such material application concurrently with the laying of the foam material. Such sheet material makes the outer surface of the foam much tougher so as to provide better resistance to mechanical damage as well as the resistance to the damaging effect of hail.

Figure 5:
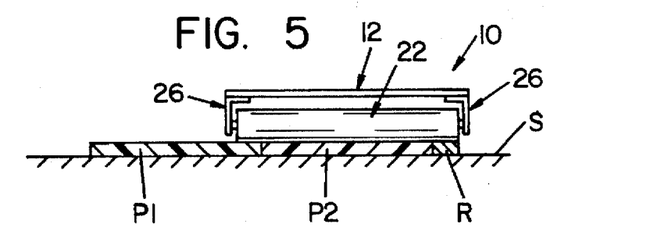
FIG. 5 is a cross-sectional elevation view schematically illustrating an arrangement for applying adjacent runs of foam plastic material in accordance with the present invention.

At the end of one pass designated P1 in FIG. 5, and in accordance with one aspect of the invention, one of the rails R is laid on substrate S laterally spaced from and parallel to the corresponding edge of pass P1, and a second pass designated P2 in FIG. 5 is laid using the repositioned rail R and the adjacent side of pass P1 to support belt 22 and thus apparatus 10. As will be appreciated from FIG. 5, lateral expansion of the material in pass P2 is confined by the inner side of rail R and the opposed inner side of pass P1.

Figure 6:
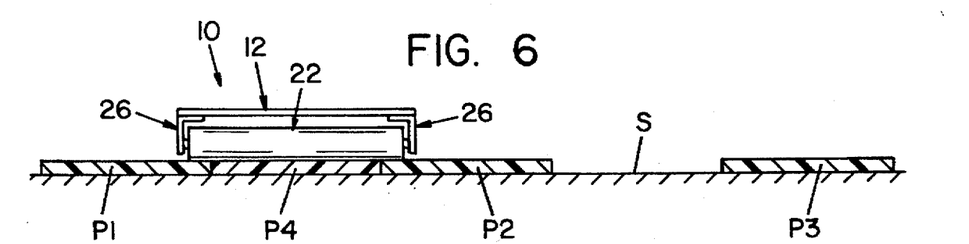
FIG. 6 is a cross-sectional elevation view schematically illustrating another arrangement for applying foam plastic material to a roof surface in accordance with the present invention.

In accordance with another aspect of the invention, as illustrated in FIG. 6, a plurality of passes P1, P2, and P3 are laid in laterally spaced-apart relationship using a pair of rails R as described hereinabove. Thereafter, pass P4 is laid between passes P1 and P2 by supporting belt 22 on the opposed sides of the latter passes, whereby lateral expansion of the material laid in pass P4 is confined by the laterally opposed side edges of passes P1 and P2. In like manner, another pass would be laid between passes P2 and P3.

Figure 7:
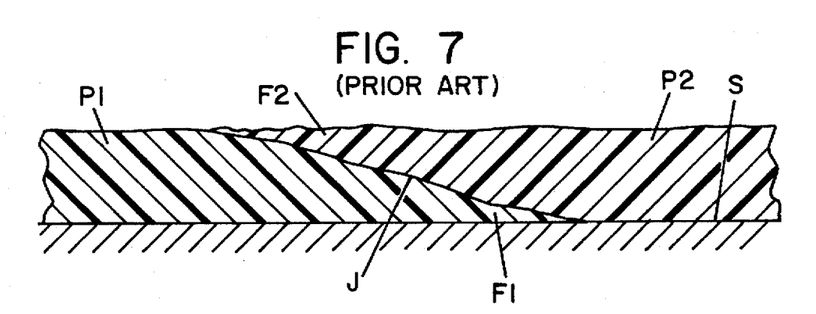
FIG. 7 is a sectional elevation view transverse to a seam between laterally adjacent runs of plastic foam roofing material spray-applied in accordance with the prior art.
Figure 8:
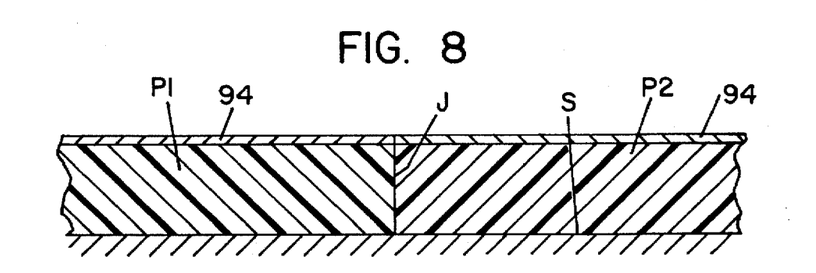
FIG. 8 is a sectional elevation view transverse to a seam between laterally adjacent runs of plastic foam roofing material applied in accordance with the present invention.

FIGS. 7 and 8 respectively illustrate the outer surface and joint structure achieved between laterally adjacent passes laid by the spray application of plastic foam material in accordance with the prior art and the laying of passes in accordance with the present invention. In this respect, as will be appreciated from FIG. 7, it is impossible with spray application to obtain a planer outer surface in that there is nothing to physically confine vertical expansion of the plastic foam material. Furthermore, spray application of the foam material results in leathered edges F1 and F2 between adjacent passes and, thus, an elongated joint J therebetween which is relatively thin adjacent the outer surface of the adjacent passes and, therefore, subject to blistering if the foam material per se provides the roof surface. Still further, it is not possible to lay roofing sheet material such as rubber or tar paper contemporaneous with the spray application of the foam plastic material. Accordingly, the application of such sheet material requires additional work after the plastic foam is laid and the attendant problem of obtaining a good bond with the plastic foam material. In contrast, as will be appreciated from FIG. 8, the vertical thickness of passes P1 and P2 relative to substrate S is uniform, and the outer surface of the adjacent passes whether defined by the plastic foam material alone or by sheet material 94 is substantially planer as a result of vertically confining expansion of the plastic foam material beneath the wall defined by belt 22. Moreover, confinement with respect to lateral expansion of the plastic foam material provides a joint J between adjacent passes which is substantially vertical, thus eliminating the blistering problem attendant to a joint having feathered edges. Still further, the laying of adjacent passes in accordance with the present invention advantageously enables the concurrent laying of sheet material 94 on the outer surface of the plastic foam and bonding of the sheet material with the foam as the latter expands and sets, whereby the roofing operation can be completed simply by sealing the seams between laterally adjacent layers of the sheet material.

Figure 9:
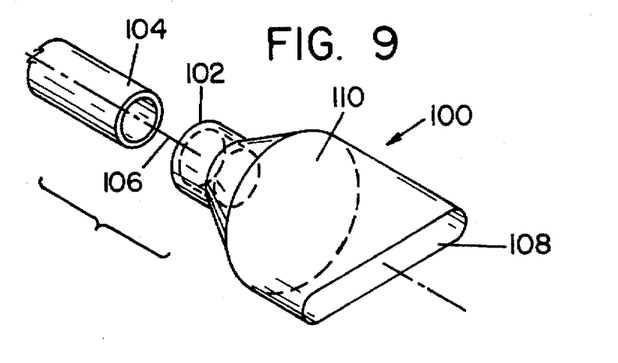
FIG. 9 is a perspective view of a spray nozzle attachment for dispensing foam plastic material on a roof surface in accordance with the present invention.

While it is described above that apparatus 10 includes an oscillating pour gun for dispensing the expandable plastic foam material onto substrate S, it will be appreciated that two or more such guns could be supported on platform 12 in laterally adjacent relationship in order to obtain the desired lateral spread of the material without having to oscillate the gun. Alternatively, a standard spray gun can be used in conjunction with a nozzle attachment such as that designated by the numeral 100 in FIG. 9 and which provides an expansion chamber for reducing the pressure of the mixed chemicals exiting the nozzle of the spray gun and a laterally elongated discharge opening which deposits the plastic foam material onto the substrate in a lateral fan pattern at low pressure. More particularly in this respect, attachment 100 includes an inlet end 102 adapted to be mounted on the exit end of the nozzle 104 of a standard spray gun. End 102 is coaxial with axis 106 of nozzle 104, and end 102 and the exit end of nozzle 104 are of substantially the same area transverse to axis 106. Attachment 100 includes an elongated outlet opening 108 coaxial with axis 106 and axially spaced from inlet 102, and an expansion chamber portion 110 between inlet 102 and outlet 108 which is larger in cross-sectional area transverse to axis 106 than the area of inlet opening 102. Accordingly, the high pressure of the spray exiting nozzle 104 is reduced in chamber portion 110 and the material then exits through opening 108 onto the roof substrate at low pressure, thus eliminating the over spray problem attendant to direct spray application of the plastic foam material to the roof surface. Outlet opening 108 is elongate in the direction between the laterally opposite sides of platform 12 such that the fan pattern laterally spreads the material in the direction between the laterally opposite sides of the platform.

Figure 10:
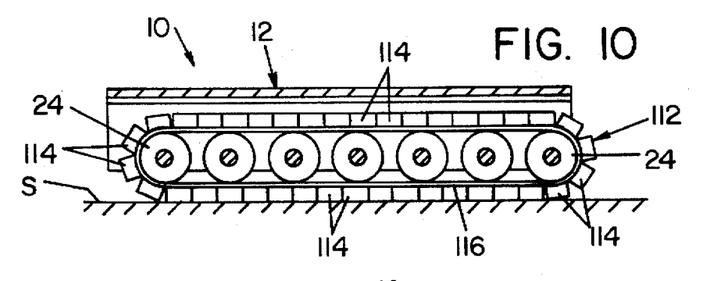
FIG. 10 is a side elevation view of an endless, segmented track removably mounted on the belt component of the apparatus illustrated in FIGS. 1–3.
Figure 11:
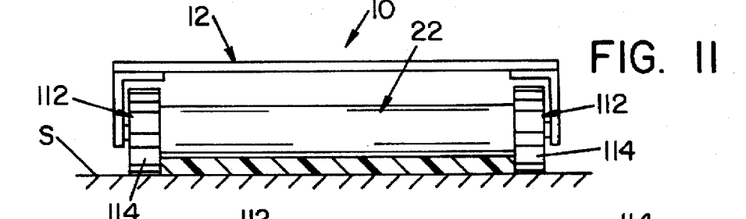
FIG. 11 is a front elevation view schematically illustrating the application of a run of foam plastic with the endless tracks mounted on the belt.
Figure 12:
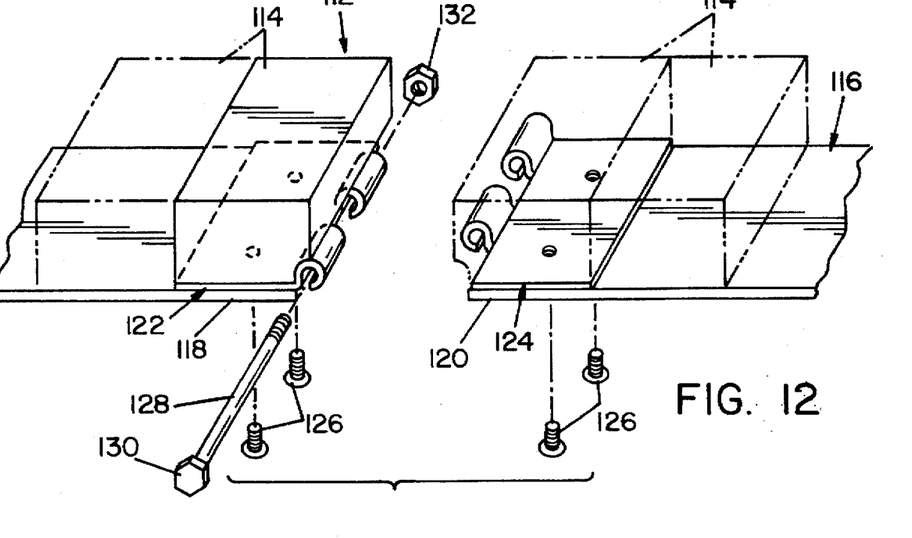
FIG. 12 is a perspective view illustrating one arrangement for removably mounting the tracks on the belt.

In accordance with another aspect of the invention, vertical support for the belt and lateral confinement of the expansion of plastic foam material therebeneath, is provided by segmented track components 112 illustrated in FIGS. 10–12 and which track components are removably mountable on belt 22 of the apparatus. With reference to the latter figures, each of the track components 112 comprises a plurality of blocks 114 mounted on a corresponding flexible belt 116 having releasably interconnectable opposite ends 118 and 120. Blocks 114 may be of wood, hard rubber, plastic or the like and have a vertical height relative to belt 22 corresponding to the thickness of the layer of plastic foam to be laid on roof substrate S. Further, the blocks have a lateral width sufficient to provide stability with respect to supporting apparatus 10 and, for example, may have a width of about 4 inches. The blocks are suitably secured to the corresponding belt 116 and have a longitudinal dimension relative thereto which provides for the blocks to pass around the endmost rollers 24 supporting belt 22 without unduly stressing the corresponding belt 116 or the connection between the blocks and belt. For example, the blocks may have a longitudinal dimension of about 2 inches. The tracks may be removably mounted on belt 22 in any suitable manner and, in the embodiment illustrated, such mounting is achieved by providing the blocks 114 adjacent ends 118 and 120 of belt 116 with complimentary hinge leaves 122 and 124, respectively, which are secured to the corresponding block 114 by threaded fasteners 126. When tracks 112 are applied about belt 22, hinge leaves 122 and 124 are longitudinally nested and releasably interconnected such as by a hinge pin 128 having a head 130 on one end and having its opposite end threaded to receive a lock nut 132.

To lay an initial pass of plastic foam material, tracks 112 are mounted on belt 22 in laterally spaced-apart relationship and the apparatus is positioned on roof substrate S such that belt 22 is supported thereabove by tracks 112 rather than by rails R in the earlier embodiment. As will be appreciated from the earlier embodiment, operation of drive motor 38 to drive belt 22 provides for tracks 112 to be driven therewith and thus to move the apparatus along the roof substrate S in connection with laying a pass of the plastic foam material. In connection with laying the first pass, vertical confinement of the expansion of the plastic foam material is provided by belt 22 as before, and confinement with respect to lateral expansion is provided by the inner sides of tracks 112. Thus, the tracks replace the support and lateral confinement functions of rails R. As will be appreciated from FIG. 5, a second pass can be laid laterally adjacent a first pass by removing one of the tracks 112 and supporting the corresponding side of belt 22 on the edge of the first pass. In this instance, the track 112 which remains mounted on belt 22 provides the support and lateral confinement functions of rail R in FIG. 5. As will be appreciated from FIG. 6, a plurality of laterally spaced apart passes can be laid with both tracks 112 mounted on belt 22, after which the tracks can be removed and the intermediate passes laid as shown and described in connection with FIG. 6.

Polyurethane foams are currently preferred in connection with the spray application of foamed plastic to a roof substrate. As is well known, polyurethane is comprised of a resin mixed with a highly-reactive isocyanate. In the spray application of polyurethane foam, the liquid chemicals are preheated to a temperature of approximately 125° F. and are pumped at high pressures such as 1000 to 3000 psi through heated hose to a dispensing gun in which the chemicals are mixed and sprayed onto a roof surface where they cure in one to three seconds. In the embodiments herein illustrated and described, the moving wall defined by belt 22 and the lateral confinement provided by rails R or tracks 112 or one or both of the lateral sides of previously laid passes of foam material provide a moving chamber wherein the exothermic heat released during the polymerization of the chemicals force the chemicals to cure rapidly whereupon the foamed material at the rear or exit end of the moving platform has expanded or set as the rear end of the platform passes thereover. Polyurethane foams known to be useable in connection with the present invention are available from Premium Polymers Inc. of Austin, Texas, under the latter's product designation System 241-2.5 and Stepan of Chicago, Ill., under the latter's product designation System 9600-00.

While considerable emphasis has been placed herein on the structure and structural inter-relationship between the component parts of the apparatus illustrated and described as well as the operation thereof in laying passes of expandable plastic foam material, it will be appreciated that other embodiments of the invention as well as modifications of the embodiments disclosed can be made without departing from the principles of the invention. In this respect in particular, while it is preferred to drive the belt by a motor mounted on the platform and to mount the plastic material dispensing gun on the platform for movement therewith, it will be appreciated that the platform can be physically pushed by an operator and/or that the dispensing gun can be hand held by an operator and manipulated so as to dispense the plastic material forwardly of the moving platform. Further, while standard mixing and dispensing guns are disclosed, it will be appreciated that other mixing and dispensing arrangements can be devised for use with the apparatus. Likewise, other arrangements for driving the platform other than by driving the belt as disclosed herein can be devised as can other arrangements for mounting the dispensing gun and/or the roll of material to be dispensed between the belt and expanding plastic foam material. These and other modifications of the embodiments disclosed as well as other embodiments of the invention will be obvious to those skilled in the art, whereby it is to be distinctly understood that the foregoing descriptive matter is to be interpreted as illustrative of the invention only and not as a limitation.

Having thus described the invention, it is claimed:

1. Apparatus for applying foamed plastic material on a roof substrate along a path having a direction and between first and second support means laterally spaced apart with respect to said direction for supporting the apparatus spaced above the substrate for movement along the path on said support means, said apparatus comprising, platform means having opposite ends with respect to said direction and laterally opposite sides, endless belt means on said platform means, said belt means having laterally opposite sides spaced apart a distance greater than the space between said first and second support means, means supporting said belt means on said platform means for displacement relative thereto in the direction between said opposite ends, said belt means having a top flight and a bottom flight, means on said platform means for driving said belt means for said top flight to move in the direction from one of said ends toward the other, means on said platform means adjacent said other end for dispensing expandable plastic foam material onto said substrate, and said bottom flight being spaced below said platform means and engaging said first and second support means for said support means to support said apparatus spaced above said substrate for movement along said path.

2. Apparatus according to claim 1, wherein said foamed plastic material has a thickness relative to said roof substrate and said first and second support means include track means removably mountable on said belt means adjacent each of said laterally opposite sides thereof, each said track means comprising a track belt and track elements on said track belt having a vertical thickness equal to said thickness of said foamed plastic material.

3. Apparatus according to claim 1, wherein said means supporting said belt means includes a plurality of roller means on said platform means spaced apart in the direction between said opposite ends and extending in the direction between said opposite sides, and wherein said means for driving said belt means includes means for driving at least one of said roller means.

4. Apparatus according to claim 1, wherein said means for dispensing plastic foam material includes dispensing nozzle means, and means on said platform means for oscillating said nozzle means laterally relative to said other end of said platform means.

5. Apparatus according to claim 1, and means on said platform means for supporting a roll of flexible sheet material for rotation about a roll axis extending between said opposite sides of said platform means.

6. Apparatus according to claim 1, wherein said means for dispensing plastic foam material includes dispensing nozzle means, said nozzle means including a nozzle member having a nozzle axis and discharge end means having an area transverse to said nozzle axis, and expansion chamber means on said nozzle member.

7. Apparatus according to claim 6, wherein said expansion chamber means includes an outlet opening spaced axially outwardly from said discharge end means, said opening having an opening axis and an area transverse thereto, and said expansion chamber means having an area transverse to said opening axis and axially between said opening and said discharge end means greater than the area of said discharge end means.

8. Apparatus according to claim 7, wherein said outlet opening is elongate in the direction between said opposite sides of said platform means.

9. Apparatus according to claim 1, wherein said means supporting said belt means includes a plurality of roller means on said platform means spaced apart in the direction between said opposite ends and extending in the direction between said opposite sides, and wherein said means for driving said belt means includes means for driving at least one of said roller means, and means on said platform means for supporting a roll of flexible sheet material for rotation about a roll axis extending between said opposite sides of said platform means.

10. Apparatus according to claim 9, wherein said flexible sheet material is one of rubber, plastic, mesh fabric, and tar paper.

* * * * *